United States Patent
Yang et al.

(10) Patent No.: US 7,250,735 B2
(45) Date of Patent: Jul. 31, 2007

(54) DRIVING CIRCUIT OF A FAN

(75) Inventors: Chih-Shih Yang, Hsin-Chu (TW);
Kung-Ching Hung, Taipei Hsien (TW)

(73) Assignee: Prolific Technology Inc., Taipei (TW)

( * ) Notice: Subject to any disclaimer, the term of this patent is extended or adjusted under 35 U.S.C. 154(b) by 0 days.

(21) Appl. No.: 11/307,491

(22) Filed: Feb. 9, 2006

(65) Prior Publication Data
US 2007/0138984 A1 Jun. 21, 2007

(30) Foreign Application Priority Data
Dec. 21, 2005 (TW) .............................. 94145613 A

(51) Int. Cl.
*H02K 21/00* (2006.01)
(52) U.S. Cl. .................. 318/254; 318/439; 318/138; 322/25
(58) Field of Classification Search ............... 318/254, 318/138, 439; 322/25
See application file for complete search history.

(56) References Cited

U.S. PATENT DOCUMENTS
2005/0231174 A1* 10/2005 Iwatani .................. 322/25

* cited by examiner

*Primary Examiner*—Karen Masih
(74) *Attorney, Agent, or Firm*—Winston Hsu

(57) ABSTRACT

A driving circuit of a fan includes a magnetic pole sensor for generating a magnetic pole sensing signal, a first waveform generator coupled to the magnetic pole sensor for generating a first waveform according to the magnetic pole sensing signal, a second waveform generator for generating a second waveform, a comparison circuit coupled to the first waveform generator and the second waveform generator for comparing the first waveform and the second waveform for generating a third waveform, a control signal generator coupled to the comparison circuit for generating a control signal according to the third waveform and an external signal, and a current generator coupled to the magnetic pole sensor and the control signal generator for outputting current to a coil of a stator of the fan according to the magnetic pole sensing signal and the control signal.

6 Claims, 10 Drawing Sheets

DRIVING CIRCUIT OF A FAN

BACKGROUND OF THE INVENTION

1. Field of the Invention

The present invention provides a driving circuit of a fan, and more particularly, a driving circuit for decreasing noise and for protecting a motor of the fan.

2. Description of the Prior Art

Computers have become the most important information hardware of modern times. In general, the higher the processing speed of a computer system is, the higher the temperature in the computer system will be (especially from heat generated by a central processing unit—CPU). Only if heat of the computer system can be effectively dissipated, can the computer system operate properly and stably. Therefore, radiator fans are set in the computer system for cooling down the CPU, a graphics card, etc. Although the radiator fans can dissipate heat in a case of the computer system to the outside of the case, noise generated by the rotating radiator fans is annoying. In order to suppress the noise, the prior art provides a driving circuit using a technology of pulse width modulation, or PWM, to control rotational speed of a radiator fan based on detected temperature.

Please refer to FIG. 1, which illustrates a schematic diagram of a prior art driving circuit 10 of a radiator fan. The driving circuit 10 drives the radiator fan using PWM technology, and includes a magnetic pole sensor 100, a timing controller 102, a triangular waveform generator 104, a control signal generator 106, and a driving stage 108. The magnetic pole sensor 100 can be a Hall sensor, utilized for sensing the magnetic pole of a rotor of the radiator fan, and transmitting the magnetic pole sensing signal to the timing controller 102. The control signal generator 106 generates a control signal $V_{PWMC}$ according to a triangular signal $V_{TRI}$ generated by triangular waveform generator 104 and an external signal $V_{PWM}$. The timing controller 102 sequentially transmits the control signal $V_{PWMC}$ to gates of transistors V1P, V1N, V2P, and V2N in the driving stage 108 according to the magnetic pole sensing signal generated by the magnetic pole sensor 100. The driving stage 108 can be a full bridge driving circuit, and can output currents through different ways from terminals O1 and O2 to a coil 110 of a stator of the radiator fan by switching the transistors V1P, V1N, V2P, and V2N. Then, by electromagnetic induction, silicon steel sheets wound around by the coil 110 generate different magnetic poles, so as to push the rotor to rotate.

In order to change rotation speed of the radiator fan, the driving circuit 10 can adjust a duty cycle of the control signal $V_{PWMC}$ through the signal $V_{PWM}$ according to temperature. Please refer to FIG. 2, which illustrates a schematic diagram of waveforms of signals $V_{TRI}$, $V_{PWM}$, and $V_{PWMC}$ in FIG. 1. As shown in FIG. 2, the signal $V_{PWM}$ is used to adjust the duty cycle of the control signal $V_{PWMC}$, so as to control the duration of outputting current and control the rotation speed of the radiator fan. When temperature is high, the driving circuit 10 can operate the radiator fan in a full speed mode, meaning that the driving circuit 10 outputs full-wave current to the coil 110. Oppositely, when temperature is low, the radiator fan is operated in a variable speed mode. Please refer to FIG. 3 and FIG. 4, which illustrate schematic diagrams of waveforms of the terminals O1 and O2 corresponding to the variable speed mode and the full speed mode. As shown in FIG. 3, when operating in the variable speed mode, the driving circuit 10 can adjust duty cycles of signals $V_{O1A}$ and $V_{O2A}$ of the terminals O1 and O2 to control the rotation speed of the radiator fan. However, since frequencies of the signals $V_{O1A}$ and $V_{O2A}$ are fixed, it is easy to generate high-frequency noise when changing the rotation speed of the radiator fan. Furthermore, in FIG. 4, when the driving circuit 10 changes to the full speed mode, signals $V_{O1B}$ and $V_{O2B}$ of the terminals O1 and O2 generate impulse, or peak, voltages, which cause high-frequency noise, damage the driving circuit 10, and reduce the lifetime of the radiator fan.

SUMMARY OF THE INVENTION

It is therefore a primary objective of the claimed invention to provide a driving circuit of a fan.

According to the claimed invention, a driving circuit of a fan comprises a magnetic pole sensor for generating a magnetic pole sensing signal according to alternation of magnetic pole of a rotor of the fan, a first waveform generator coupled to the magnetic pole sensor for generating a first waveform according to the magnetic pole sensing signal generated by the magnetic pole sensor, a second waveform generator for generating a second waveform, a comparison circuit coupled to the first waveform generator and the second waveform generator for comparing the first waveform and the second waveform for generating a third waveform, a control signal generator coupled to the comparison circuit for generating a control signal according to the third waveform generated by the comparison circuit and an external signal, and a current generator coupled to the magnetic pole sensor and the control signal generator for outputting current to a coil of a stator of the fan according to the magnetic pole sensing signal generated by the magnetic pole sensor and the control signal generated by the control signal generator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
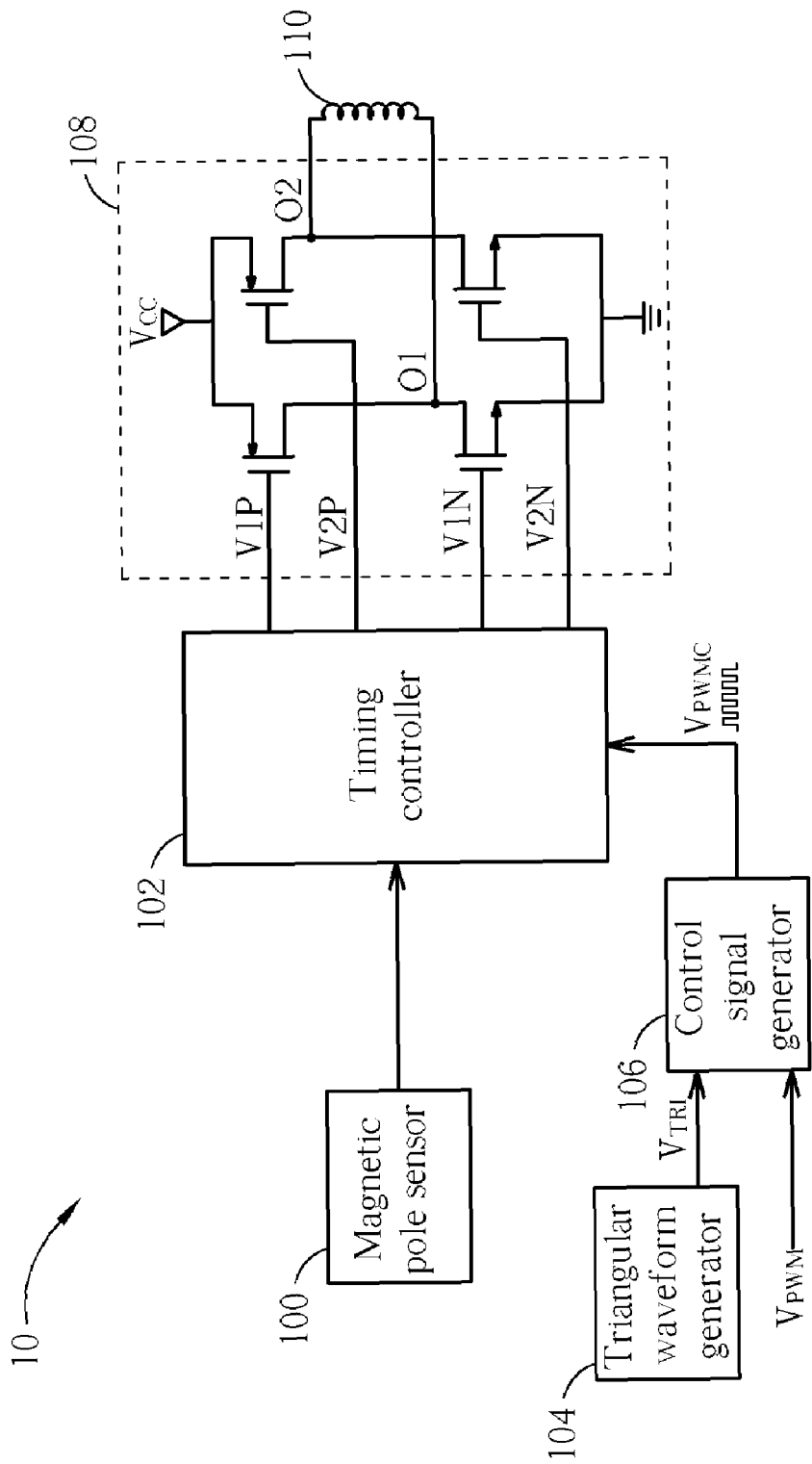
FIG. 1 illustrates a schematic diagram of a prior art driving circuit of a radiator fan.
Figure 2:
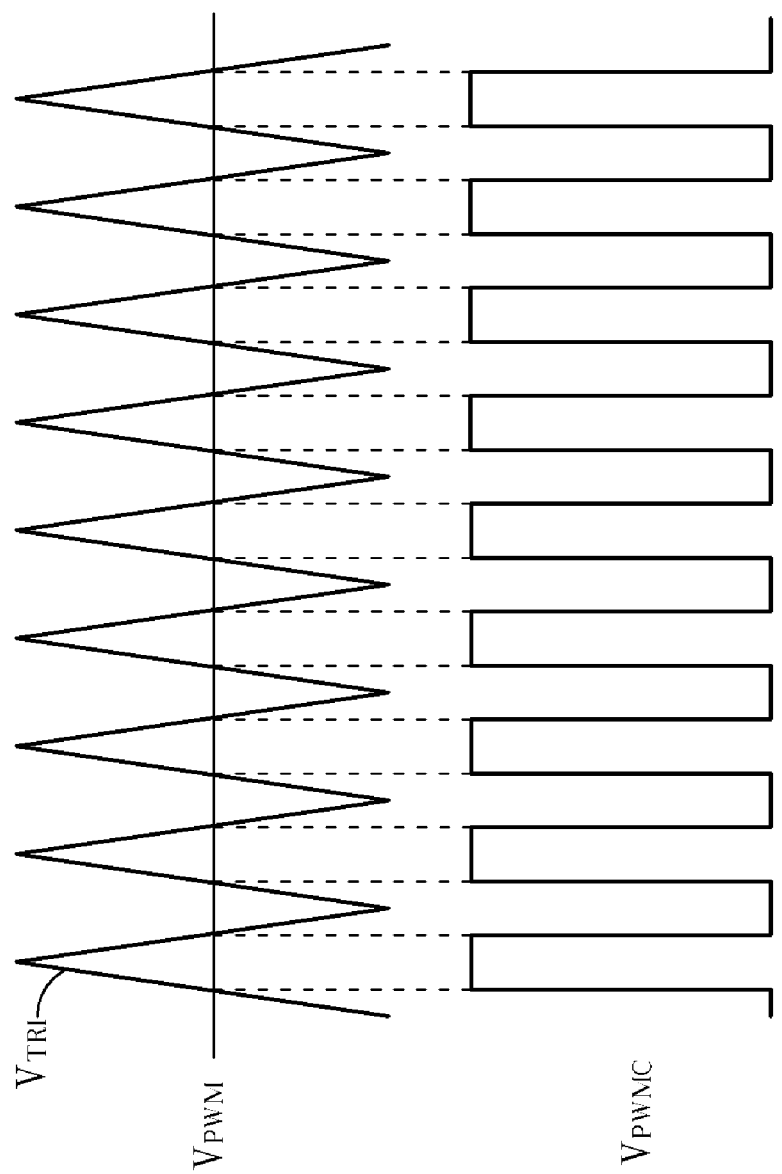
FIG. 2 illustrates a schematic diagram of related waveforms in FIG. 1.
Figure 3:
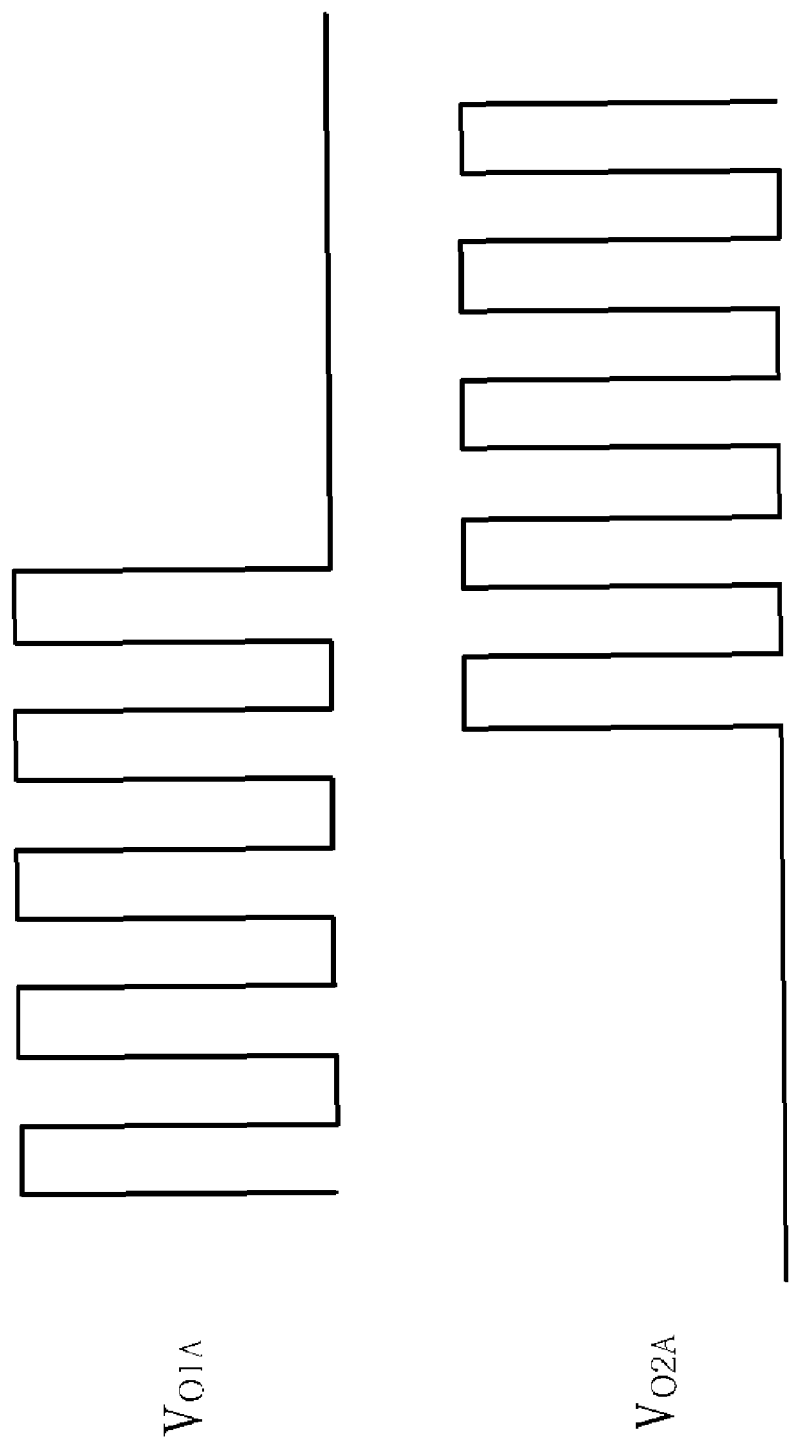
FIG. 3 illustrates a schematic diagram of waveforms corresponding to a variable speed mode.
Figure 4:
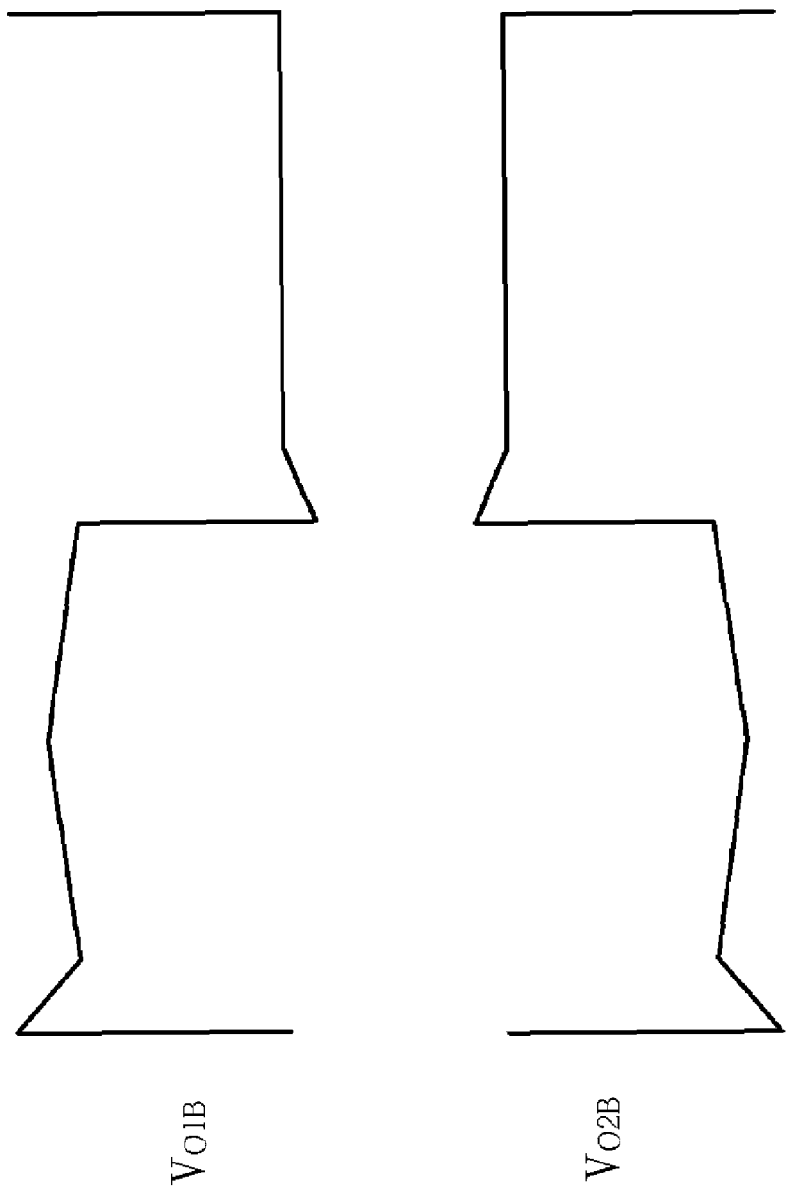
FIG. 4 illustrates a schematic diagram of waveforms corresponding to a full speed mode.
Figure 5:
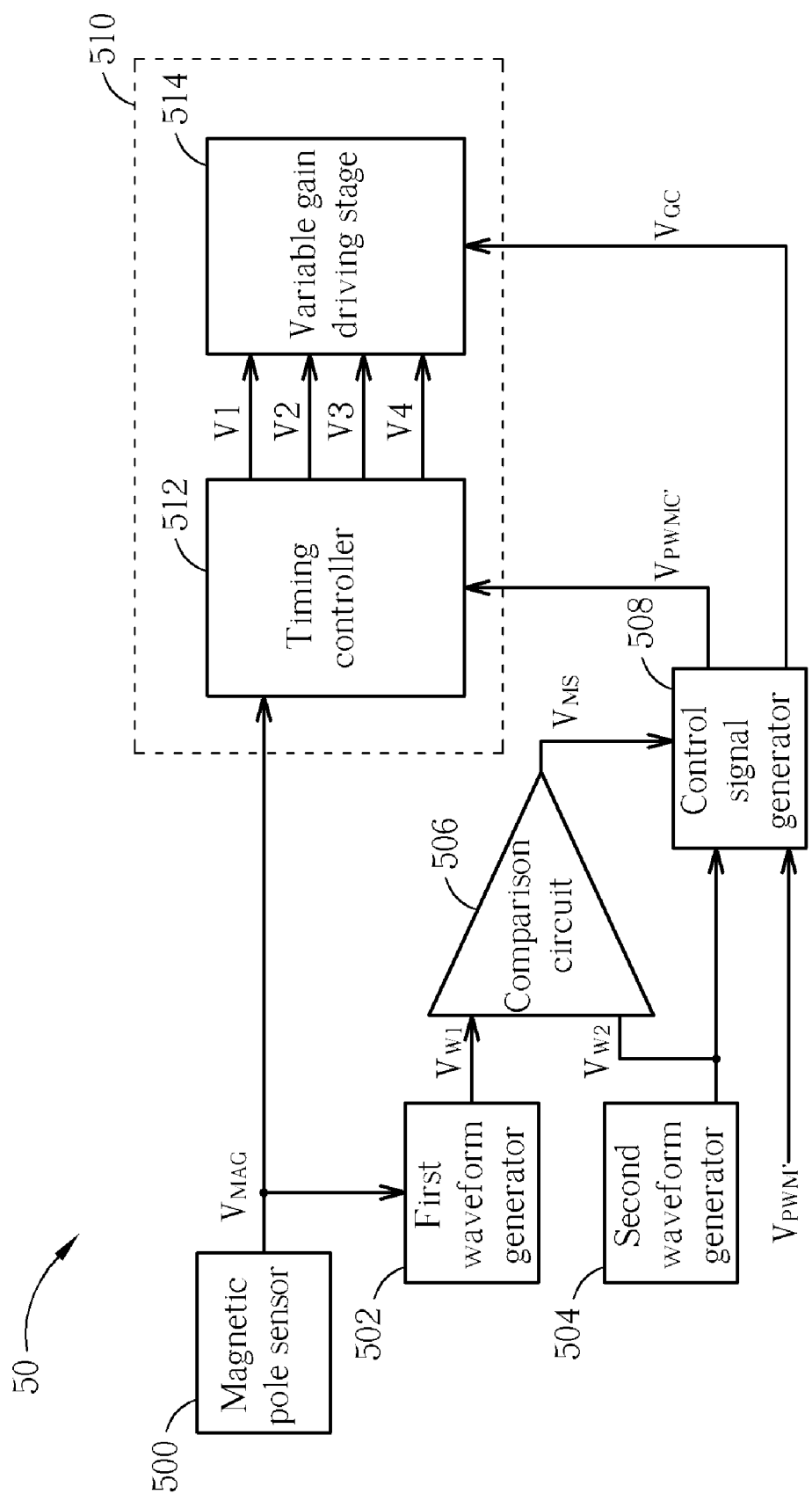
FIG. 5 illustrates a schematic diagram of a driving circuit in accordance with a preferred embodiment of the present invention.

Please refer to FIG. 5, which illustrates a schematic diagram of a driving circuit 50 in accordance with a preferred embodiment of the present invention. The driving circuit 50 includes a magnetic pole sensor 500, a first waveform generator 502, a second waveform generator 504, a comparison circuit 506, a control signal generator 508, and a current generator 510. The magnetic pole sensor 500 generates a magnetic pole sensing signal $V_{MAG}$ according to a magnetic pole of a rotor of the fan. The first waveform generator 502 outputs a signal $V_{W1}$ to the comparison circuit 506 according to the magnetic pole sensing signal $V_{MAG}$. The second waveform generator 504 generates a signal $V_{W2}$ to the comparison circuit 506 and the control signal generator 508. The signal $V_{W1}$ and the signal $V_{W2}$ preferably are a trapezoid wave signal and a triangular wave signal. A period of the signal $V_{W2}$ is far smaller than that of the signal $V_{W1}$. The comparison circuit 506 compares the signal $V_{W1}$ and the signal $V_{W2}$, and outputs a modulated signal $V_{MS}$ to the control signal generator 508 for generating a control signal $V_{PWMC'}$. The control signal $V_{PWMC'}$ is controlled by an external signal $V_{PWM'}$, whose duty cycle is related to a voltage level of the external signal $V_{PWM'}$. The current generator 510 includes a timing controller 512 and a variable gain driving stage 514, utilized for outputting currents to a coil of a stator of the fan according to the magnetic pole sensing signal $V_{MAG}$ and the control signal $V_{PWMC'}$.

Figure 6:
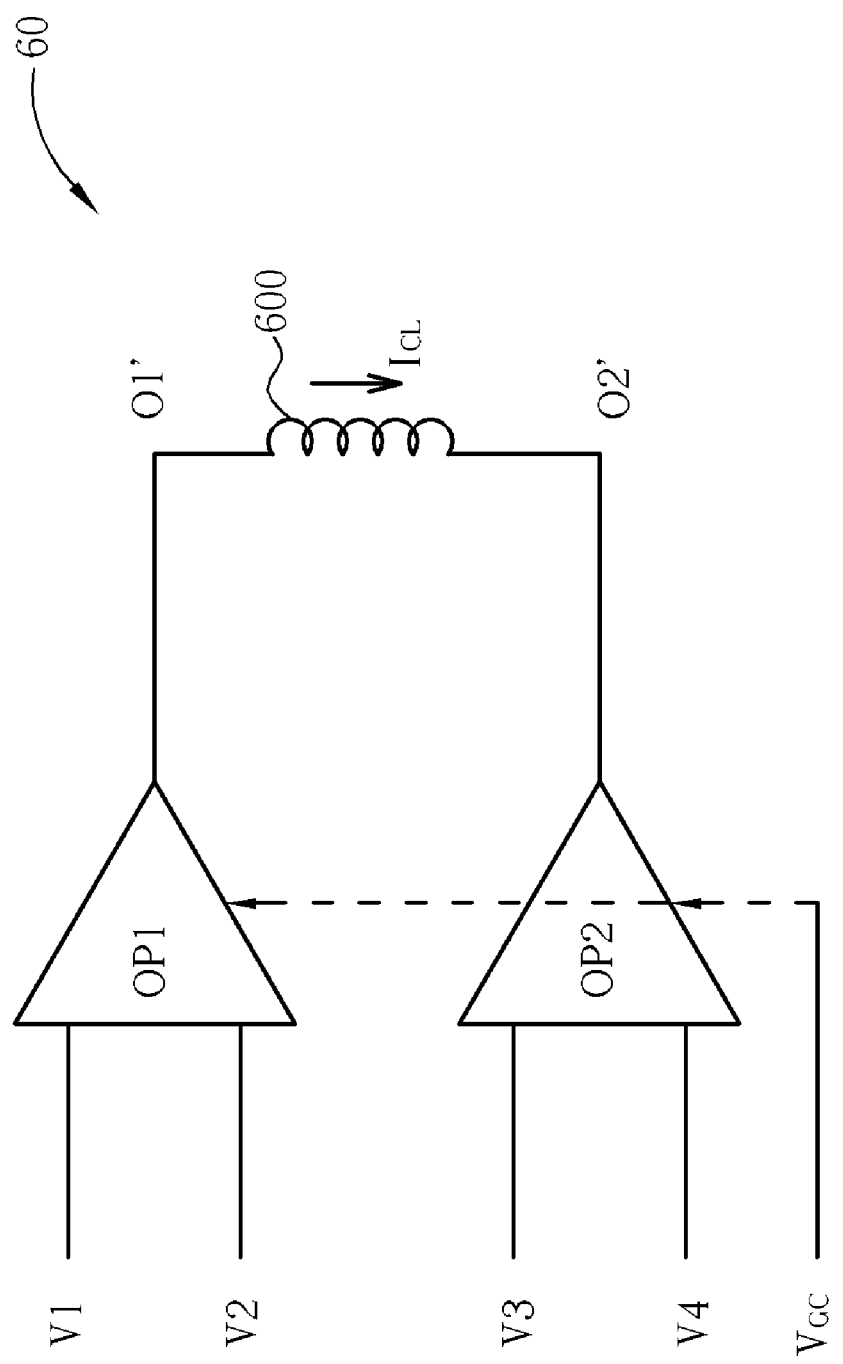
FIG. 6 illustrates a schematic diagram of a variable gain amplifier in accordance with the present invention.

Please refer to FIG. 6, which illustrates a schematic diagram of a variable gain amplifier 60. The variable gain amplifier 60 is used to implement the variable gain driving stage 514 in FIG. 5, and outputs currents to a coil 600 of the stator of the fan through terminals O1' and O2'. The variable gain amplifier 60 includes operational amplifiers OP1 and OP2. Gains of the operational amplifiers OP1 and OP2 can be adjusted according to a control signal $V_{GC}$ generated by the control signal generator 508. The gains of the operational amplifiers OP1 and OP2 in a full speed mode are lower than that in a variable speed mode. The timing controller 512 outputs signals V1, V2, V3, and V4 to the variable gain amplifier 60 to output currents with different ways to the coil 600, so that silicon steel sheets wound around by the coil 600 generates different magnetic poles to push the rotor to rotate.

Figure 7:
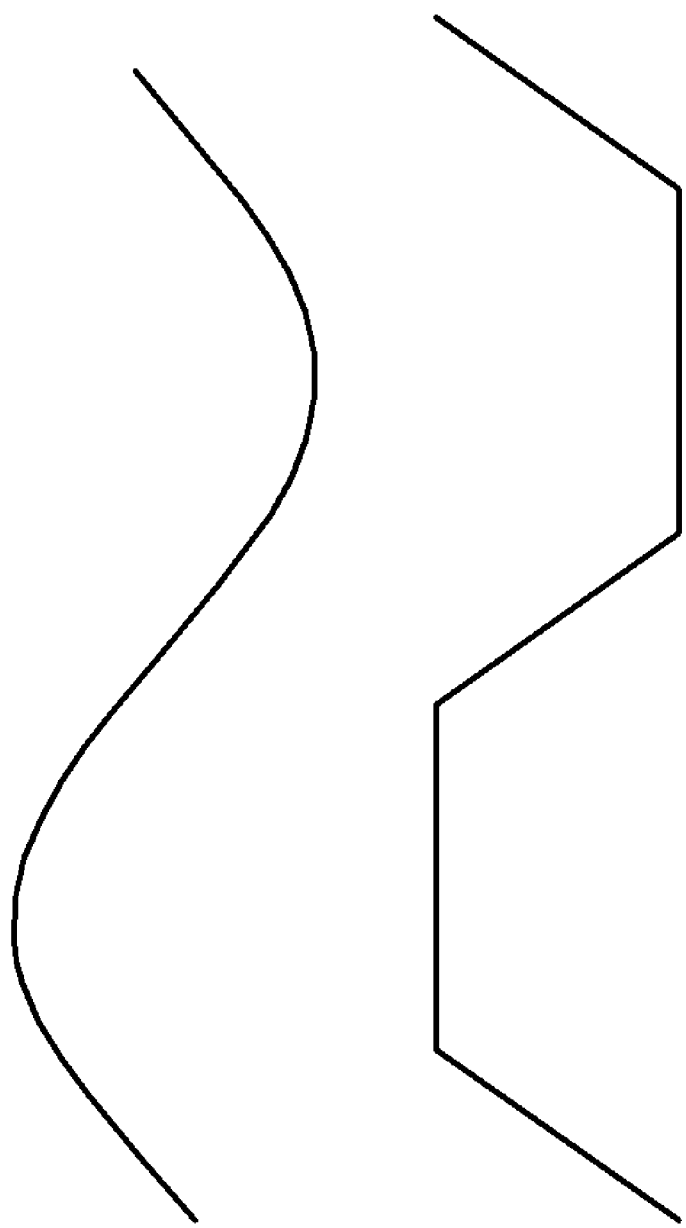
FIG. 7 illustrates a schematic diagram of waveforms of the magnetic pole sensing signal and the signal outputted from the first waveform generator in FIG. 5.
Figure 8:
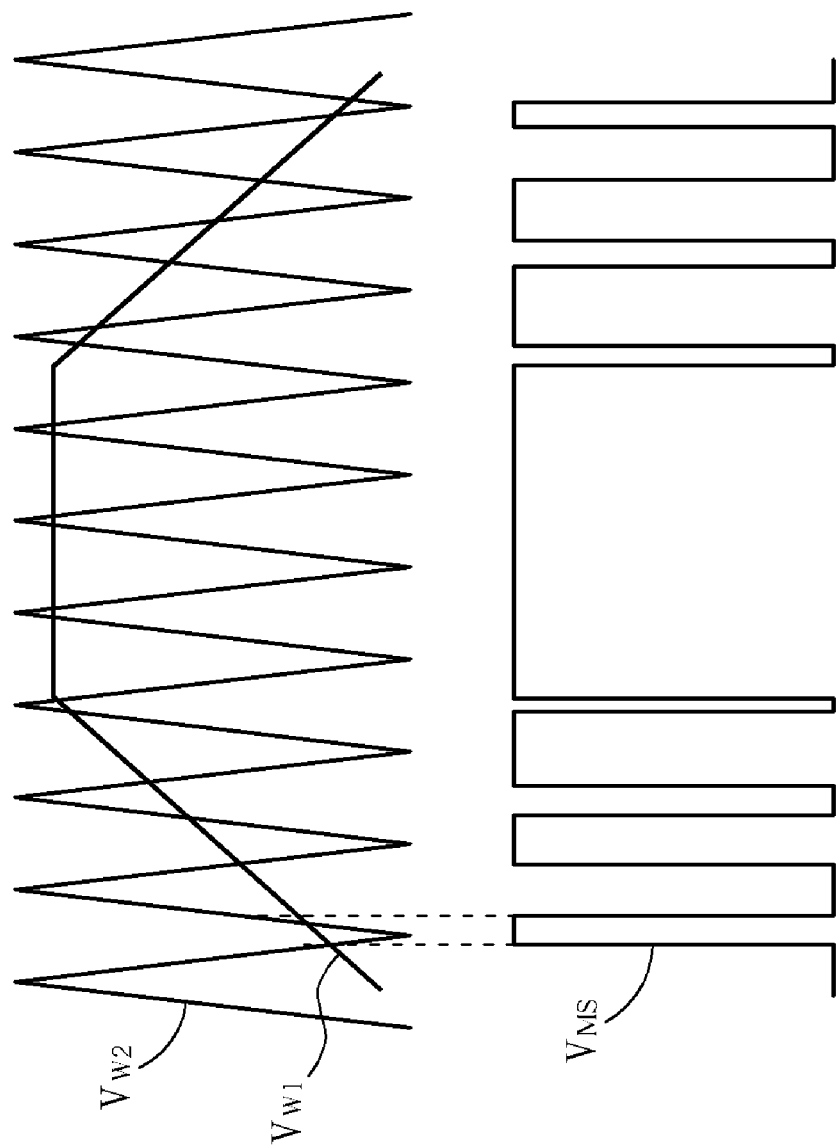
FIG. 8 illustrates a schematic diagram of waveforms corresponding to the comparison circuit in FIG. 5 when in the variable speed mode.
Figure 9:
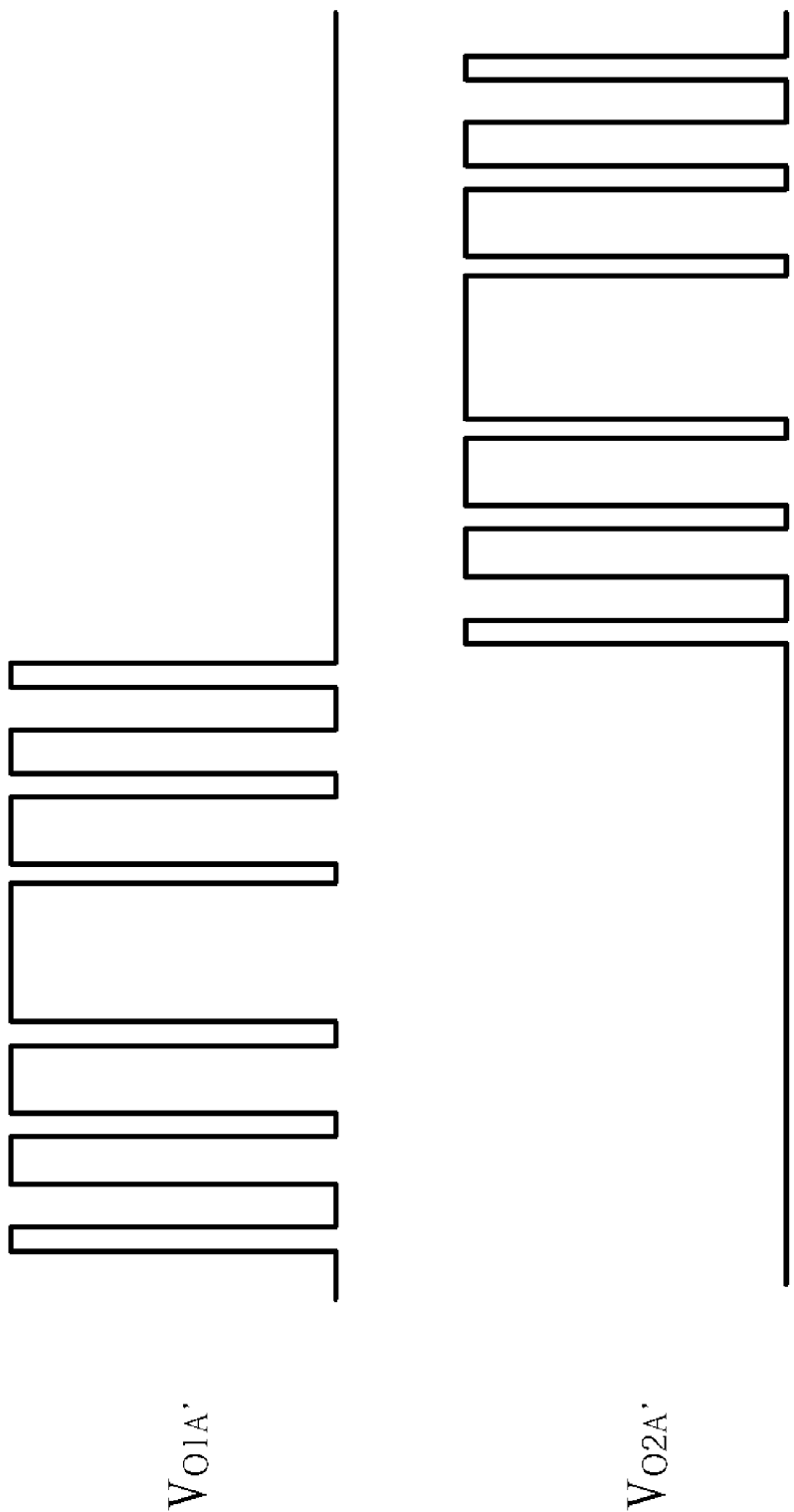
FIG. 9 illustrates a schematic diagram of waveforms when the driving circuit in FIG. 5 is operated in the variable speed mode.
Figure 10:
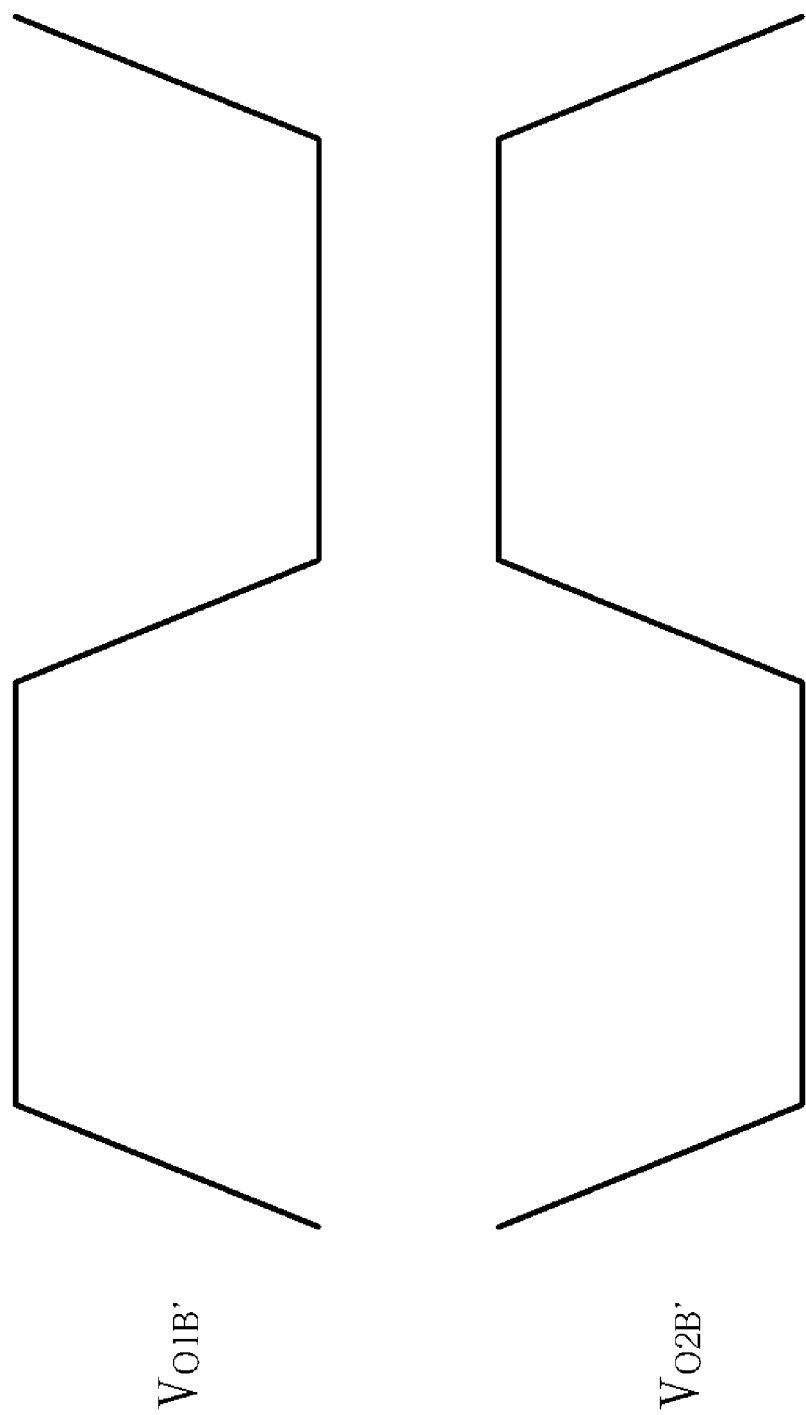
FIG. 10 illustrates a schematic diagram of waveforms when the driving circuit in FIG. 5 is operated in the full speed mode.

As to waveforms of the signals in FIG. 5 and FIG. 6, please refer to FIG. 7 to FIG. 10. FIG. 7 illustrates a schematic diagram of waveforms of the magnetic pole sensing signal $V_{MAG}$ and the signal $V_{W1}$ outputted from the first waveform generator 502. FIG. 8 illustrates a schematic diagram of waveforms of input and output signals ($V_{W1}$, $V_{W2}$, and $V_{MS}$) of the comparison circuit 506 when in the variable speed mode. FIG. 9 illustrates a schematic diagram of signals $V_{O1A'}$ and $V_{O2A'}$ of the terminals O1' and O2' when in the variable speed mode. FIG. 10 illustrates a schematic diagram of waveforms of signals $V_{O1B'}$ and $V_{O2B'}$ of the terminals O1' and O2' when in the full speed mode. As shown in FIG. 8 and FIG. 9, a duty cycle of the modulated signal $V_{MS}$ outputted from the comparison circuit 506 is unfixed, and changes as the relationship between the signal $V_{W1}$ and the signal $V_{W2}$ changes, so that a current $I_{CL}$ outputted to the coil 600 changes linearly. Therefore, high-frequency noise can be reduced when in variable speed mode. In addition, when in full speed mode, the gains of the operational amplifiers OP1 and OP2 are decreased, so that the signals $V_{O1B'}$ and $V_{O2B'}$ of the terminals O1' and O2' do not include impulses as shown in FIG. 10. As a result, noise can be reduced, the motor can be protected, and the lifetime of the fan can be prolonged.

In summary, when the driving circuit 50 is in the variable speed mode, the duty cycle of the modulated signal $V_{MS}$ is unfixed, so that the current $I_{CL}$ changes linearly. Therefore, high-frequency noise can be reduced. Besides, when in the full speed mode, the gains of the operational amplifiers OP1 and OP2 are decreased, so that the signals outputted to the coil do not include impulses. Therefore, noise can be reduced, and the lifetime of the fan can be prolonged.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit of a fan comprising:
   a magnetic pole sensor, for generating a magnetic pole sensing signal according to alternation of magnetic pole of a rotor of the fan;
   a first waveform generator coupled to the magnetic pole sensor, for generating a first waveform according to the magnetic pole sensing signal generated by the magnetic pole sensor;
   a second waveform generator, for generating a second waveform;
   a comparison circuit coupled to the first waveform generator and the second waveform generator, for comparing the first waveform and the second waveform for generating a third waveform;
   a control signal generator coupled to the comparison circuit, for generating a control signal according to the third waveform generated by the comparison circuit and an external signal; and
   a current generator coupled to the magnetic pole sensor and the control signal generator, for outputting current to a coil of a stator of the fan according to the magnetic pole sensing signal generated by the magnetic pole sensor and the control signal generated by the control signal generator.

2. The driving circuit of claim 1, wherein the control signal generator is further coupled to the second waveform generator, and the control signal generator generates the control signal to the current generator according to the second waveform generated by the second waveform generator, the third waveform generated by the comparison circuit, and the external signal.

3. The driving circuit of claim 1, wherein the current generator comprises:
   a driving stage coupled to the coil of the stator of the fan, for outputting current; and
   a timing controller coupled to the magnetic pole sensor, the control signal generator, and the driving stage, for transmitting the control signal generated by the control signal generator to the driving stage according to a period of the magnetic pole sensing signal.

4. The driving circuit of claim 3, wherein the driving stage is a full-bridge driving circuit.

5. The driving circuit of claim 1, wherein the current generator comprises:
   a driving stage having a first operational amplifier and a second operational amplifier coupled to terminals of the coil of the stator of the fan, for outputting current, wherein gains of the first operational amplifier and the second operational amplifier are changed according to the control signal generated by the control signal generator; and a timing controller coupled to the magnetic pole sensor, the control signal generator, and the driving stage, for sequentially transmitting the control signal generated by the control signal generator to the first operational amplifier and the second operational amplifier according to a period of the magnetic pole sensing signal generated by the magnetic pole sensor.

6. The driving circuit of claim 5, wherein the gains of the first operational amplifier and the second operational amplifier when the fan is operated in full speed are smaller than that when the fan is not operated in full speed.

* * * * *